United States Patent [19]

Kamiguchi et al.

[11] Patent Number: 5,713,036
[45] Date of Patent: Jan. 27, 1998

[54] PROGRAMMABLE LOGIC CONTROLLER HAVING PROGRAM FOR DESIGNATING ADDRESSES OF MEMORY TO WHICH DATA INDICATING OPERATING STATUSES OF MACHINE ARC TO BE STORED

[75] Inventors: Masao Kamiguchi, Kawaguchiko-machi; Noriaki Neko; Masanobu Takemoto, both of Oshino-mura, all of Japan

[73] Assignee: Fanuc, Ltd., Yamanashi, Japan

[21] Appl. No.: 447,694

[22] Filed: May 23, 1995

[30] Foreign Application Priority Data

May 26, 1994 [JP] Japan ................................. 6-134924

[51] Int. Cl.$^6$ ................................................. G06F 15/76
[52] U.S. Cl. ................................................. 395/800; 364/140
[58] Field of Search ...................... 395/700, 800, 395/739, 737, 85, 88; 364/140, 136, 146, 192, 194, 141, 147

[56] References Cited

U.S. PATENT DOCUMENTS

| | | | |
|---|---|---|---|
| 4,627,025 | 12/1986 | Ninnemann et al. | 395/800 |
| 4,703,414 | 10/1987 | Inone et al. | 364/147 |
| 4,827,512 | 5/1989 | Hirokawa et al. | 380/23 |
| 4,853,891 | 8/1989 | Wollscheid et al. | 395/522 |
| 5,008,834 | 4/1991 | Mizumo et al. | 395/92 |
| 5,485,552 | 1/1996 | Mizuno et al. | 395/99 |

Primary Examiner—Moustafa M. Meky
Attorney, Agent, or Firm—Staas & Halsey

[57] ABSTRACT

A programmable logic controller capable of freely and sequentially controlling peripheral equipment without modifying a system program. Necessary data for sequence control of the peripheral equipment are selected from data defined in the system program. The memory addresses corresponding to the data are assigned to addresses to be used in a user program in an address storage unit. The controller executes the system program to sequentially control an industrial machine, and also executes the user program to control the peripheral equipment. The controller refers to the data being used in executing the system program, which are necessary for sequence control of the peripheral equipment, based on the designated relationship of the addresses stored in the address storage unit. Since necessary data for sequence control of the peripheral equipment can be obtained by combining the addresses arbitrarily by the user, it is not necessary to modify the system program in order to obtain the necessary data for sequence control of the peripheral equipment.

6 Claims, 3 Drawing Sheets

FIG. 2

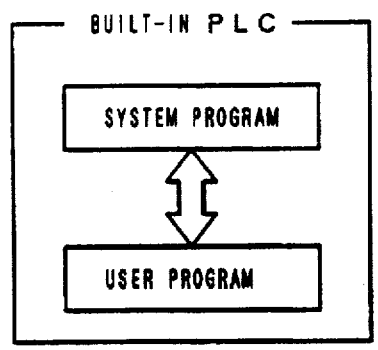

FIG. 3a

```
┌─────── SYSTEM PROGRAM ───────┐
│                              │
│ R200.0 ⇔ "ON" WHILE X AXIS IS MOVING │
│ R200.1 ⇔ "ON" WHILE Y AXIS IS MOVING │
│ R200.2 ⇔ "ON" WHILE Z AXIS IS MOVING │
│    •         •               │
│    •         •               │
│    •         •               │
│ R300.0 ⇒ SLOWDOWN TO STOP X AXIS │
│ R300.1 ⇒ SLOWDOWN TO STOP Y AXIS │
│ R300.2 ⇒ SLOWDOWN TO STOP Z AXIS │
│    •         •               │
│    •         •               │
│    •         •               │
└──────────────────────────────┘
```

FIG. 3b

```
┌─── PARAMETER ───┐
│  STORAGE FILE   │
│                 │
│ UR0.0  : R200.0 │
│ UR0.1  : R200.1 │
│ UR0.2  : R200.2 │
│   •       •     │
│   •       •     │
│ UR1.0  : R300.0 │
│ UR1.1  : R300.1 │
│ UR1.2  : R300.2 │
│   •       •     │
│   •       •     │
│ UX0.0  : X 0.7  │
│ UX0.1  : X 2.0  │
│   •       •     │
│   •       •     │
│ UY0.0  : Y 1.1  │
│ UY0.1  : Y 3.3  │
│   •       •     │
│   •       •     │
└─────────────────┘
```

FIG. 4

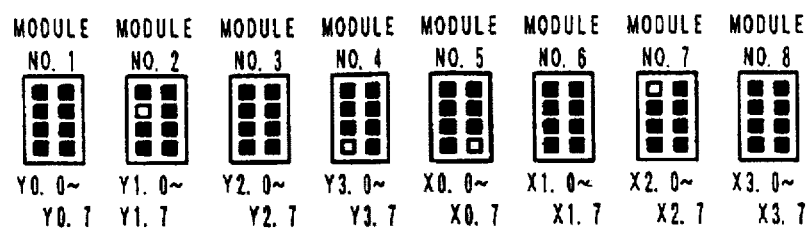

PROGRAMMABLE LOGIC CONTROLLER HAVING PROGRAM FOR DESIGNATING ADDRESSES OF MEMORY TO WHICH DATA INDICATING OPERATING STATUSES OF MACHINE ARC TO BE STORED

BACKGROUND OF THE INVENTION

1. Field of the Invention

This invention relates to a programmable logic controller for sequence-controlling an industrial machine and its peripheral equipment.

2. Description of the Related Art

FIG. 6 of the accompanying drawings shows the schematic arrangement for sequence-controlling an industrial machine and its peripheral equipment by a conventional programmable logic controller. The programmable logic controller 1 provided within the industrial machine sequentially controls various parts of the industrial machine and its peripheral equipment, based on a prestored non-editable system program. The kinds of signals to be transferred through respective input and output terminals of I/O modules 2 of the industrial machine and their addresses are defined by the system program. Only the minimum number of the I/O modules 2 are provided for lowering the cost of the machine. If the user desires to construct a system by adding a peripheral equipment that is not assumed by the system program, it is impossible to modify the system program without a dedicated development tool so that the maker of the industrial machine has to additionally create a special system program to meet the user specifications and has to expand the I/O modules as the need arises. Consequently, when modifying the conventional system as shown in FIG. 6, the user connects a programmable logic controller 3 on the market with the I/O modules 2 and connects peripheral equipment Nos. 1, 2, . . . with the programmable logic controller 3, to control the peripheral equipment Nos. 1, 2, . . . by the programmable logic controller 3, taking conformity between the programmable logic controller 3 and the programmable logic controller 1.

The general-purpose programmable logic controller 3, which is connected with the input-output terminals of the I/O modules 2 of the industrial machine to receive signals from the programmable logic controller 1, sequentially controls the peripheral equipment Nos. 1, 2, . . . based on these signals and the user program stored in the controller 3, and outputs an operation completion signal to the built-in programmable logic controller 1 as the need arises.

Since the kinds of signals to be outputted from the I/O modules 2 are predetermined by a fixed system program of the programmable logic controller 1, suitable signals needed for sequence control of the peripheral equipment Nos. 1, 2, . . . are not always obtained from the I/O modules 2. If necessary signals are not obtained, it would be necessary to modify the system program of the programmable logic controller 1 to change the kind of signal to be transferred via the I/O modules 2. However, it is difficult for the user to modify the system program. If user asked the maker for the system modification, it would have required a considerable cost and a great deal of time, thus making the programmable logic controller 3 expensive. Further, even if appropriate signals needed for sequence control can be obtained, connection is not always possible if there is a difference in an arrangement of pins between the I/O modules 2 of the programmable logic controller 2 and the terminals of the programmable logic controller 3.

The number of cable junction increases between the I/O modules 2 of the industrial machine and the peripheral equipment Nos. 1, 2, . . . through the general-purpose programmable logic controller 3, that tends to cause malfunctions such as contact failure so that maintenance and checking would be laborious and time-consuming.

SUMMARY OF THE INVENTION

It is an object of the present invention to provide a programmable logic controller for sequentially controlling various kinds of peripheral equipment reliably in cooperation with an industrial machine by the programmable logic controller built in the industrial machine, without adding an expensive general-purpose programmable logic controller or laborious modification by the maker.

A programmable logic controller of the present invention comprising: a processor for executing a non-editable system program and an editable user program; a memory for storing a first data group to be used in executing the system program and a second data group to be used in executing the user program in respective predetermined addresses, the respective data of the first data group being assigned to specific addresses of the memory; and an address storage unit for storing a designated relationship between the respective addresses of the memory, in which said second data group is to be stored, and the addresses of said memory, which are assigned to the respective data of the first data group, wherein the processor transfers necessary signals for executing the user program through the address storage unit.

The addresses of the memory in which data is to be stored are predefined by a system program previously created by the maker. Data to be used in the programmable logic controller generally includes various operating statuses of the industrial machine, the kinds of signals to be transferred via respective input/output terminals of the I/O modules and the statuses of their address allocation. The user selects the data necessary for sequence control of additional peripheral equipment, designates their addresses of the memory to the addresses to be used in the user program, and storing the designated relationship in the address storage means. The user edits and creates a desired user program for sequence control of the peripheral equipment and stores the created user program in the memory. The programmable logic controller executes the system program for sequence-controlling the industrial machine and also executes the user program for sequence-controlling the peripheral equipment, referring to the data needed for sequence control of the peripheral equipments based on the designated relationship between the addresses stored in the address storage unit.

As a result, sequence control of an industrial machine and sequence control of the additional peripheral equipment, which have been conventionally achieved by a combination of a built-in programmable logic controller and a general-purpose programmable logic controller, are realized by a single built-in programmable logic controller, so that an interface of hardware for connecting the programmable logic controllers is omitted and an interface is formed by software in the address storage unit, for communicating the sequence control function of the industrial machine and the sequence control function of the additional peripheral equipment. Since the user may arbitrarily rearrange the interface in conformity with the data needed for sequence control of the peripheral equipment, the data needed for sequence control of the peripheral equipment can be selectively referred to in the user program. Accordingly, there is no need for modifying the system program itself to obtain the data necessary for sequence control of the peripheral equipment, although the memory addresses in which the data is to be stored are defined by a non-editable system program. Further, as the interface to communicate the sequence control function of the industrial machine with the sequence control function of the peripheral equipment is constituted by software, data and signals can be transferred as desired between the industrial machine and the additional peripheral equipment without causing a problem such as inconformity in pin arrangement in the interface of hardware, and without increasing the number of cable junctions in the case of the combination of a built-in programmable logic controller and a general-purpose programmable logic controller. Furthermore, since the system program is reserved to be non-editable by the user, the safety of the industrial machine and also the user is secured without a possibility that an important program relating to the basic operation and safety of the industrial machine might be inadvertently modified.

BRIEF DESCRIPTION OF THE DRAWINGS

FIG. 2 is a diagram showing the relationship between a system program and a user program, which are to be executed by a CPU of the programmable logic controller shown in FIG. 1;

FIG. 3a is a schematic diagram showing a part of the system program;

FIG. 3b is a schematic diagram showing a part of an address storage means;

FIG. 4 is a diagram showing the manner in which input and output terminals defined by the system program are allocated;

DETAILED DESCRIPTION OF THE PREFERRED EMBODIMENT

Figure 1:
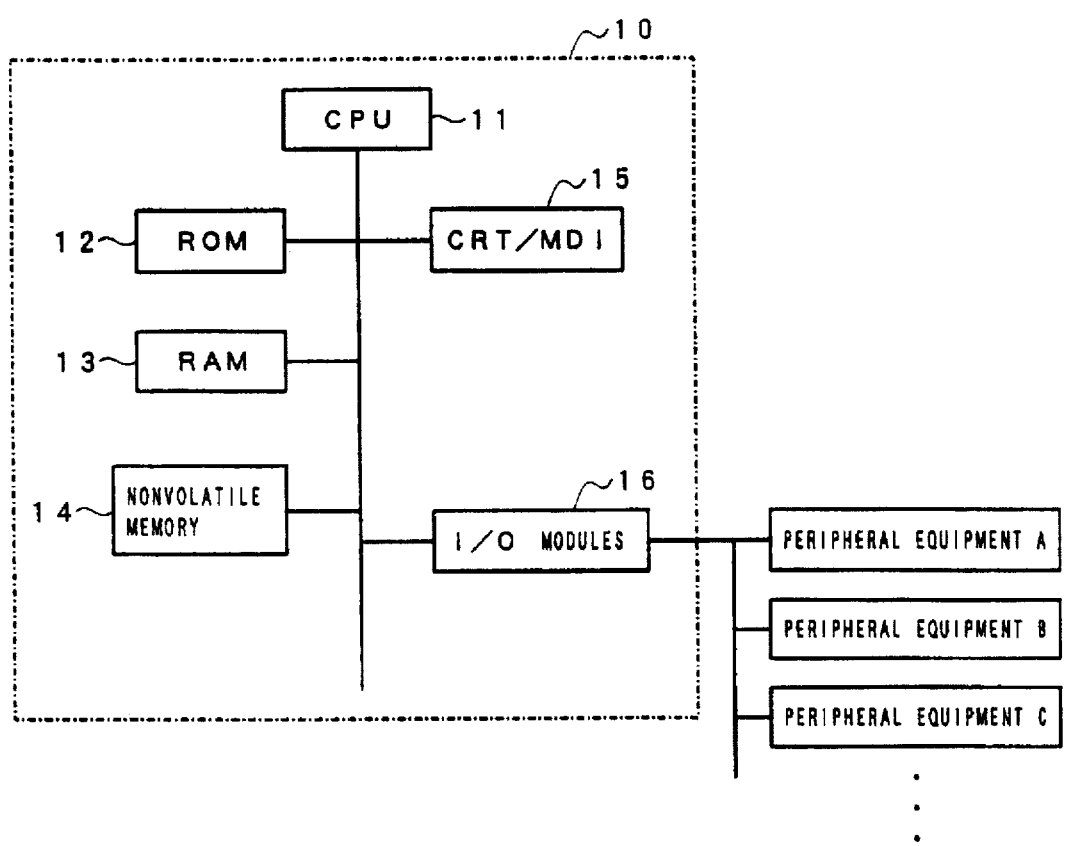
FIG. 1 is a block diagram of a programmable logic controller according, to an embodiment of the present invention.
Figure 6:
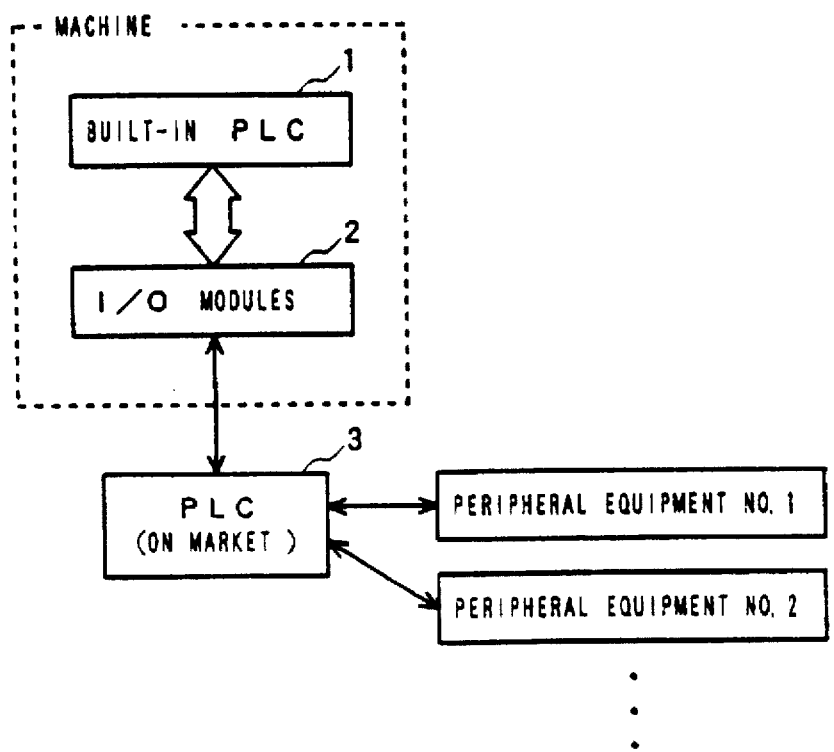
FIG. 6 is a block diagram showing a conventional system in which an industrial machine and its peripheral equipment are controlled by a built-in programmable logic controller and a general-purpose programmable logic controller.

A programmable logic controller 10 shown in FIG. 1 is provided within an industrial machine, in a same manner as that of the conventional built-in programmable logic controller 1 shown in FIG. 6. The programmable logic controller 10 comprises a microprocessor (CPU) 11 as a control unit, a ROM 12, a RAM 13 and a nonvolatile memory 14 as storage unit, a manual data input device with a CRT display (CRT/MDI) 15, and I/O modules 16. Programs and data can be edited by CRT/MDI 15. Since the function of the conventional built-in programmable logic controller 1 and the function of the general-purpose programmable logic controller 3 are combined in the single programmable logic controller 10 provided within the industrial machine, various peripheral equipment A, B, C, ... are directly connected to the input and output terminals of I/O modules 16 for sequence control, without the necessity of connecting the general-purpose programmable logic controller 3 with peripheral equipment Nos. 1, 2, ... for sequence control. Accordingly, there is not any particular difference in basic hardware between the conventional programmable logic controller 1 of FIG. 6 and the programmable logic controller 10 of this embodiment, but the two controllers are distinctive from each other In structure of the storage unit for storing programs, contents of the stored programs and method of executing the respective stored program.

FIG. 2 schematically shows the relationship between a not-editable system program stored in advance in the storage unit of the programmable logic controller 10 and a user program edited or created by the user according to this embodiment.

The system program includes an important program relating to the basic operation and safety of the industrial machine, and a program for designating the addresses of the memories (the nonvolatile memory 14 or the RAM 13) in which data used in executing the program are to be stored. The data to be stored in the nonvolatile memory 14 or the RAM 13 includes various operating statuses, the kinds of signals to be transferred via the individual input and output terminals of the I/O modules 16, the allocating the addresses to the respective input and output terminals.

It is assumed in this embodiment that, in the system program, the memory addresses, in which respective data used in executing the program is to be stored, is defined in advance by the maker as shown in FIG. 3a. In the illustrated example, when the X axis of the industrial machine is being moved a flag indicating that the X axis is in moving is set at the address R200.0 of the memory. In the same manner, when the Y axis or the Z axis is being moved, a flag indicating that the axis is in moving is set in the addresses R200.1 or R200.2 of the memory. Namely, the addresses R200.0, R200.1, R200.2, are designated for storing data representing the respective operating statuses of the X, Y and Z axes, while the addresses R300.0, R300.1, R300.2, are designated for storing slowdown and stop commands of the respective axes. When the flag is set at the addresses R300.0, R300.1, R300.2 according to the result of execution of the system program or the user program, the respective axes are slowed down to stop by the system program.

FIG. 4 shows the manner in which the input and output terminals of the I/O modules 16 are assigned to the respective addresses X0.0–X3.7 and Y0.0–Y3.7 as defined by the system program. The I/O modules 16 of this embodiment are composed of output modules Nos. 1–4 and input modules Nos. 5–8. The memory addresses X0.0–X3.7 and Y0.0–Y3.7 in which data are to be stored are assigned to the input and output terminals of the respective modules as shown in FIG. 4. For example, the memory address Y0.0 is assigned to the first pin (top in left row) of the output module 1, and the memory address X0.4 is assigned to the fifth pin (top in right row) of the input module 5. Namely, when a flag of the signal output is set at the address Y0.0 in executing the system program or user program, a signal is outputted to the peripheral equipment connected to the first pin of the output module No. 1 according to the command of the system program, and when a signal is inputted from the peripheral equipment connected to the fifth pin of the input module 5, a signal detection flag is set at the address X0.4.

The individual memories designated by the addresses R200.0–R200.2, R300.0–R300.2, X0.0–X3.7, Y0.0–Y3.7 are memory addresses in which data used in executing the system program are to be stored. These addressed are defined by the system program.

The important program relating the basic operation and safety, and the program for defining the memory addresses in which the data is to be stored, i.e. the program for determining various operating statuses of an industrial machine, the kinds of signals to be transferred via the respective input and output terminals of the I/O modules 16, and the assignment of the addresses to the respective input and output terminals, are included in the system program created by the maker in advance and stored in a write prohibit area of the ROM 12 or the nonvolatile memory 14 and cannot be edited by the user.

To the contrary, the user program is editable as desired by operating the CRT/MDI 15 and is stored, together with a parameter storage file as an address storage unit shown in FIG. 3b, in a writable area of the nonvolatile memory 14. Of course, the user may reload data in the parameter storage file freely by operating the CRT/MDI 15. Although the user program is usually relates only to sequence control of the peripheral equipment, a relatively important program (other than the system program) having no direct relation to the basic operation or safety of an industrial machine may be included in the editable user program.

FIG. 3b schematically shows an example of the parameter storage file. In the parameter storage file, memory addresses, such as UR0.0–UR0.2, UR1.0–UR1.2, UX0.0–UX0.1, UY0.0–UY0.1, which are predefined by the maker to be used by the user program, are not-editably registered. To each of these addresses UR0.0–UR0.2, UR1.0–UR1.2, UX0.0–UX0.1, UY0.0–UY0.1, an address in which data to be used in the user program is to be stored is assigned as desired by the user.

The number of addresses usable in the parameter storage file is considerably small as compared with the number of addresses for storing the data to be used in the system program. Only the memory addresses, in which necessary data for sequence control of the peripheral equipment is to be stored, is selected and stored by the user as desired in the parameter storage file. Thus the data of various operating statuses of the industrial machine which are necessary for sequence control of the peripheral equipment can be cited on the user program with reference to parameter storage file. Likewise, by selecting the individual input and output terminals of the I/O modules, it is possible to determine the designation of input and output of signals and to designate the kinds of the signals.

By using the parameter storage file as an interface between the system program and the user program, there would not be caused such problem of inconformity of pin arrangement or mismatching of kinds of signals, that are encountered with the conventional art of FIG. 6, in which the programmable logic controller 1 for sequence control of the industrial machine and the programmable logic controller 3 for sequence control of the peripheral equipment are combined by an interface of hardware for transferring signals. It is possible to obtain the data representing various operating statuses of the industrial machine necessary for sequence control of the peripheral equipment on the user program at need. Also, it is possible to select the individual input and output terminal of the I/O modules freely on the user program to determine the destination of input and output of signals and to designate the kinds of the signals.

In the example of FIG. 3b, the addresses R200.0–R200.2 for storing the operating statuses of the individual axes of the industrial machine are designated in the addresses UR0.0–UR0.2 of the parameter storage file by the user. The addresses R300.0–R300.2 for storing the slowdown and stop commands of various axes are designated in the addresses UR1.0–UR1.2 by the user. Further, the addresses X0.7 and X2.0 for storing the unused input terminals of the modules No. 5 and 7 are designated in the addresses UX0.0 and UX0.1, respectively, of the parameter storage file by the user, and the addresses Y1.1 and Y3.3 for storing the unused output terminal of the modules No. 2 and 4 in the addresses UY0.0 and UY0.1, respectively, by the user. In FIG. 4, the terminals indicated as being painted out are input and output terminal for connection with the peripheral equipment to be sequentially controlled by the system program. The terminals X0.7, X2.0, Y1.1 and Y3.3 indicated in blank are the input and output terminals to be freely used by the user.

The user creates and edits the program for sequence control of additional peripheral equipment using the CRT/MDI 15, citing the addresses UR0.0–UR0.2, UR1.0–UR1.2, UX0.0–UX0.1, UY0.0–UY0.1 of the parameter storage file and stores the resulting program in the nonvolatile memory 14 as the user program. For example, it is assumed that the input terminal for the operation start command of the user option peripheral equipment A is connected with the unused output terminal of the address Y1.1 in the module No. 2. If a user program is created to operate the peripheral equipment A only when the X axis of the industrial machine is stopped, the program is created for outputting signals to the address UY0.0 only when the X axis is stopped by citing the address UR0.0 of the parameter storage file to discriminate whether or not the X axis of the industrial machine is stopped. This is the case where the sequence control of the peripheral equipment is started by detecting the operating status of the industrial machine.

It is also assumed that the output terminal for the operation completion signal of the user option peripheral equipment B is connected with the unused input terminal of the address X0.7 in the module No. 5. The input terminal of the operation start command of the user option peripheral equipment C is connected to the unused output terminal of the address Y3.3 in the module No. 4. If a user program is created to start the operation of the peripheral equipment C upon completion of operation of the peripheral equipment B, the program for outputting a signal to the address UY0.1 is created by citing the address UX 0.0 of the parameter storage file to detect the completion of operation of the peripheral equipment B. This is the case where the operating status of a peripheral equipment is detected to start the sequence control of another peripheral equipment. Similarly, if the operation of the Y axis of the industrial machine is to be stopped upon completion of operation of the peripheral equipment B, a user program for outputting a signal to the address UR1.1 corresponding to the memory address R300.1 is created by citing the address UX0.0 of the parameter storage file to detect the completion of operation of the peripheral equipment B. This is the case where the industrial machine is sequentially controlled by detecting the operating status of a peripheral equipment.

Using the parameter storage file merely as a citation index, the user program is executed accessing the addresses R200.0–R200.2, R300.0–R300.2, X0.7–X2.0, Y1.1–Y3.3 corresponding to the addresses UR0.0–UR0.2, UR1.0–UR1.2, UX0.0–UX0.1, UY0.0–UY0.1 cited in the user program so as to obtain information stored in these addresses. Alternatively, the data stored in the addresses R200.0–R2.00.2, R300.0–R300.2, X0.7–X2.0, Y1.1–Y3.3 corresponding to the addresses UR0.0–UR0.2, UR1.0–UR1.2, UX0.0–UX0.1, UY0.0–UY0.1 may be read in every predetermined cycle, and the read data may be actually written to the corresponding addresses of the parameter storage file.

In this embodiment, the latter way is adopted. In the system program, there is provided a program for reading in every predetermined cycle the information stored in the addresses registered in the parameter storage file and actually writing the read data to the corresponding addresses of the parameter storage file. Since the number of the addresses usable in the parameter storage file is limited to a considerably small number as compared with the number of memory addresses for storing the data to be used in system program, this writing processing would give little burden to the microprocessor.

Figure 5:
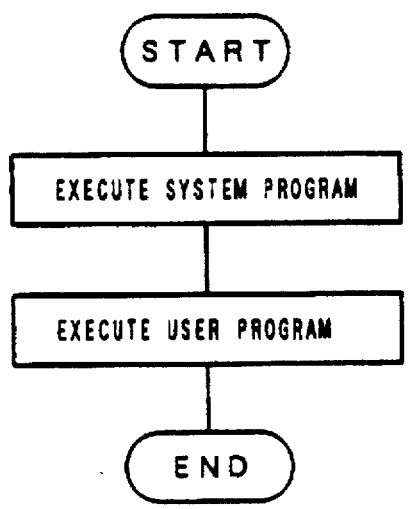
FIG. 5 is a flowchart showing a way of executing the system program mid the user program.

The programmable logic controller 10 repeatedly executes in every predetermined cycle the system program stored in advance in the storage means and the user program created and edited by the user, as shown in FIG. 5, so that both the sequence operation of the industrial machine and the sequence operation of the peripheral equipment are controlled substantially in parallel.

Since the memory addresses to be registered in the parameter storage file can be arbitrarily determined by the user, it is possible to create and edit a user program for sequence control of any peripheral equipment by freely using the signals (data) admitted by the system program. In the presence of unoccupied terminals of the I/O modules 16, signals can be inputted/outputted in accordance with the result in execution of the user program by arbitrarily selecting and assigning the unoccupied terminals for transfer of signals and by arbitrarily determining the kinds of signals such as an operation start command and an operation completion signal. It is therefore possible to freely select and use various kinds of peripheral equipment, without causing problems, such as inconformity of pin arrangement and mismatching of kinds of signals.

According to the programmable logic controller of the present invention, since the sequence control of an industrial machine and the sequence control of its peripheral equipment are realized by a single programmable logic controller, it is unnecessary to provide two programmable logic controllers, i.e. a programmable logic controller dedicated for sequence control of the industrial machine and a programmable logic controller dedicated for sequence control of the peripheral equipment, thus reducing the costs of facility investment. Further, since the interface for associating the sequence control function of the industrial machine and the sequence control function of the peripheral equipment with one another is constituted by software of the address storage unit, necessary data for sequence control of the peripheral equipment is selected for citation in the user program so that modification of the system program to control the peripheral equipment, which is essential in the conventional art, would be unnecessary. Further, since the contents of the address storage can be modified to change the allocation of the input and output terminals, it is possible to freely transfer data and signals between the sequence control function of the industrial machine and the sequence control function of the peripheral equipment, without causing a problem such as inconformity of pin arrangement, which is encountered with the interface of hardware. It is accordingly possible to freely select and use peripheral equipment. Furthermore, since the system program is protected against edition by the user, it is possible to secure safety of the industrial machine and also the user without the possibility that the important programs relating the basic operation and safety of the industrial machine might be inadvertently modified.

What is claimed is:

1. A programmable logic controller for sequence-controlling an industrial machine, comprising:

a processor executing a non-editable system program and an editable user program;

a memory storing a first data group to be used in executing the system program and a second data group to be used in executing the user program in respective predetermined addresses, the respective data of the first data group being assigned to a specific addresses of said memory;

an address storage unit storing a designated relationship between the respective addresses of said memory in which the second data group is to be stored, and the addresses of said memory which are assigned to respective data of the first data group, wherein said processor transfers necessary signals for executing said user program through said address storage unit; and an I/O module group for transferring signals to and from peripheral equipment, the system program including a program designating the addresses of said memory to which data indicating various operating statuses of the industrial machine are to be stored, and the addresses to which signals transferred between each input and output terminal of said I/O module group and the peripheral equipment are to be stored.

2. A programmable logic controller according to claim 1, wherein said processor reads the data stored in the address of said memory corresponding to the address cited in the user program, referring to said address storage unit in executing the user program.

3. A programmable logic controller according to claim 1, wherein said processor reads the data stored in the address of said memory which are designated by said address storage unit, and writes the read data to said address storage unit for every predetermined cycle.

4. A programmable logic controller for sequence-controlling an industrial machine, comprising:

processor means executing a non-editable system program and an editable user program;

memory means storing a first data group to be used in executing the system program and a second data group to be used in executing the user program in respective predetermined addresses, the respective data of the first data group being assigned to a specific addresses of said memory means;

address storage means storing a designated relationship between the respective addresses of said memory means in which the second data group is to be stored, and the addresses of said memory means which are assigned to respective data of the first data group, wherein said processor means transfers necessary signals for executing said user program through said address storage means; and I/O module group means for transferring signals to and from peripheral equipment, the system program including a program designating the addresses of said memory means to which data indicating various operating statuses of the industrial machine are to be stored, and the addresses to which signals transferred between each input and output terminal of said I/O module group means and the peripheral equipment are to be stored.

5. A programmable logic controller according to claim 4, wherein said processor means reads the data stored in the address of said memory means corresponding to the address cited in the user program, referring to said address storage means in executing the user program.

6. A programmable logic controller according to claim 4, wherein said processor means reads the data stored in the address of said memory means, which are designated by the address storage means, and writes the read data to said address storage unit for every predetermined cycle.

* * * * *

UNITED STATES PATENT AND TRADEMARK OFFICE
CERTIFICATE OF CORRECTION

PATENT NO. : 5,713,036
DATED : January 27, 1998
INVENTOR(S) : Masao KAMIGUCHI, et al.

It is certified that error appears in the above-identified patent and that said Letters Patent is hereby corrected as shown below:

Cover Page, Item [54] Title, line 5, change "ARC" to --ARE--

Signed and Sealed this

Eighteenth Day of August, 1998

Attest:

BRUCE LEHMAN

Attesting Officer

Commissioner of Patents and Trademarks